April 24, 1945.                    J. W. BEECHER                       2,374,523
                        PROTECTIVE APPARATUS FOR FLUID METERS
                                Filed Dec. 22, 1942

INVENTOR.
John Winfred Beecher
BY
E.C. Sanborn
   Attorney

Patented Apr. 24, 1945

2,374,523

UNITED STATES PATENT OFFICE 2,374,523

PROTECTIVE APPARATUS FOR FLUID METERS

John Winfred Beecher, Waterbury, Conn., assignor to The Bristol Company, Waterbury, Conn., a corporation of Connecticut Application December 22, 1942, Serial No. 469,813

14 Claims. (Cl. 73—205)

This invention relates to a device for protecting differential manometers against abnormal pressure differentials consequent upon failure or breakage of the conduits or piping systems to which they are connected, and more especially to the protection of differential manometers when used in conjunction with orifices or other constricting devices for the purpose of determining the rate of flow of a liquid through conduits.

In a very large proportion of the installations of differential manometers for the purpose of determining the pressure developed across a constriction in a pipe line or conduit, the static pressure existing in the piping system is much greater than the maximum differential pressure corresponding to the full range of the instrument. When operating conditions are normal the manometer is not at any time subjected to a differential pressure in excess of that to which its measuring range is adapted; and, while the parts of the instrument may be directly subjected to the static pressure existing in the line, this appears only as a pressure differing from that of the surrounding atmosphere, and is easily resisted by the heavy casing of the instrument. So long as the piping system is intact and the rate of flow through the measuring constriction does not greatly exceed that for which the instrument is designed, the pressures applied to the delicate measuring element of the manometer (which may be in the nature of a bellows, a Bourdon spring, or a mercury column) are neutralized, with exception of the differential due to flow through the constriction, which differential is determined by the manometer and may be interpreted as a measure of the rate of flow.

In the installation of flow meters it is frequently expedient to locate the manometer unit at a considerable distance from the main pipe line in which the flow is to be determined. The connecting line (generally a pair of relatively small and fragile pipes or tubes) is thus likely to be subjected to mechanical damage or to unauthorized disconnection such as would be highly improbable in the part of the piping system immediately adjacent to the instrument. In the event of such a breakage or accidental disconnection, there is likely to develop either an unbalance pressure in the manometer or a flow of the measured fluid through the system in such a manner as to set up pressures which may be damaging or even destructive to the manometer element.

It is an object of this invention to provide means whereby any flow of fluid through the instrument piping system in excess of the slight transfer necessary for measuring purposes will automatically be checked, whereby the manometer element will be relieved of pressures corresponding to such flow.

It is a further object of the invention to provide means whereby excessive pressure across the manometer developing from any cause whatsoever, will be relieved before it has attained a magnitude sufficient to damage the measuring element.

In the drawing: Fig. 1 is a diagrammatic representation of a differential manometer connected across an orifice in a pipe line for the purpose of measuring flow therein, equipped with a device embodying the principles of the invention.

Figure 1:
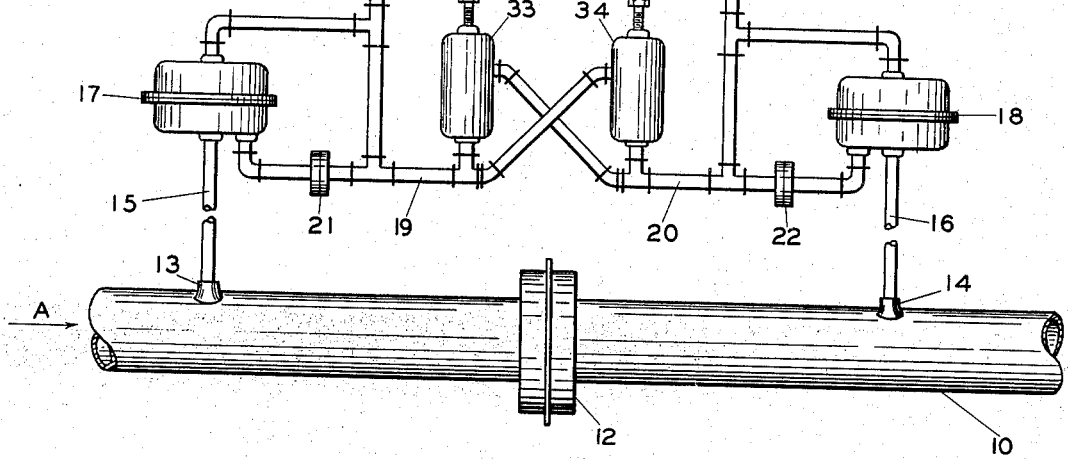

Referring now to Fig. 1 of the drawing, the numeral 10 designates a conduit or pipe line adapted to carry a fluid the rate of whose flow is to be determined by means of a differential manometer 11 connected across an orifice member 12 inserted in the conduit 10. To openings 13 and 14 tapped in the wall of the conduit 10 on opposite sides of the orifice member 12 are connected small pipes or conduits 15 and 16 respectively leading to stop valves 17 and 18 respectively, whose construction and internal arrangement will hereinafter be set forth. Connected to the stop valves 17 and 18, and normally in communication with the conduits 15 and 16 respectively are conduits 19 and 20, including small orifice plates or restrictions 21 and 22 respectively, and communicating with the manometer 11, whereby any pressure differential between the conduits 19 and 20 will be determined by said manometer and indicated in terms of flow through the orifice 12.

Figure 2:
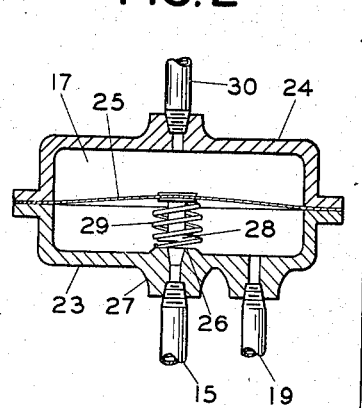
Fig. 2 is a sectional view of one of the elements forming a part of the invention.

The construction and operation of the stop valves 17 and 18 will be understood by reference to Fig. 2, which is a sectional view of the former of these valves. Clamped between a lower and an upper cup shaped member 23 and 24 respectively is a diaphragm element 25, whereby there is formed between said members a closed chamber divided into two portions by said diaphragm element.

Centrally formed on the interior surface of the member 23 is a seat portion 26 through which communication is established between the portion of the internal chamber beneath the diaphragm 25 and an outlet 27 to which is connected the conduit 15. Carried by the diaphragm 25 is a seating member 28 adapted to cooperate with the seat portion 26 to interrupt communication between said chamber and said outlet. The diaphragm 25 is normally maintained, either by its own resiliency or by a light spring 29, in such a position that the seating member is out of engagement with the seat portion 26, allowing free communication between the internal chamber and the outlet 27. The conduit 19 communicates with the portion of the internal chamber in which is located the seating member 28, so that under normal conditions conduits 19 and 15 are in direct communication with each other. The portion of the enclosed chamber on the side of the diaphragm 25 remote from the seating member 28 is provided with an outlet 30. The stop-valve 18 is structurally similar to the stop-valve 17, but, by modification of the spring or of the strength of the enclosed diaphragm, may if desired be adjusted to close at another value of differential pressure from that which will actuate the stop-valve 17. The outlet 30 of the stop-valve 17 is connected directly to the portion of the conduit 19 on the side of the constriction 21 toward the manometer 11; and in a similar manner the upper part of the enclosed chamber in the stop valve 18 is connected directly to the portion of the conduit 20 on the side of the constriction 22 toward said manometer.

Figure 3:
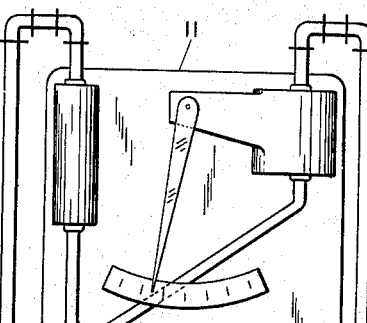
Fig. 3 is a sectional view of another of the elements forming a part of the invention.
Figure 3:
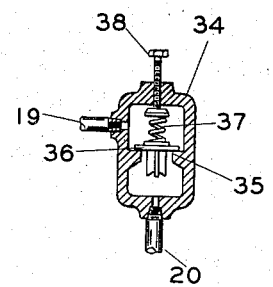

Connection between the conduits 19 and 20 to by-pass the manometer 11 is provided by means of two back-pressure valves 33 and 34, the construction of which will be understood by reference to Fig. 3, which is a sectional representation of the back-pressure valve 34. The interior of the valve 34 is formed into a closed chamber separated into an upper and lower portion by a partition 35 having therein a valve seat. Co-operating with said valve seat is a seating member 36 normally maintained in engagement with said seat by means of a spring 37 whose effective force may be varied by means of an adjusting screw 38. The upper portion of the chamber within the valve 34 communicates with the conduit 19 on the side of the constriction 21 toward the manometer, and the lower portion of the valve similarly with the conduit 20. The back-pressure valve 33 is structurally similar to the valve 34, but may be adjusted to open at a different pressure value from that which said last-named valve will be actuated. The valve 33 is connected in such a manner that the upper portion of its internal chamber communicates with the conduit 20 and the lower portion with the conduit 19.

In considering the operation of the protective device to which the present invention is directed, it may first be assumed that the apparatus is connected as shown in Fig. 1 and is operating under normal conditions, with fluid passing through the conduit 10 in the direction indicated by the arrow A. Under this condition the stop valves 17 and 18 will be standing open, so that the conduit 15 communicates with the conduit 19 through the constriction 21 and the conduit 16 with the conduit 20 through the constriction 22. The back-pressure valves 33 and 34, due to the influence of the springs therein, will both be closed. Thus, the two sides of manometer 11 will be in communication with the conduit 10 on the corresponding sides of the orifice plate 12. The differential pressure developed due to the flow of fluid in the conduit 10 through the orifice 12 will thus be applied to the manometer 11, which instrument will function as a flow meter in the conventional manner.

It may now be assumed that the conduit 15 has become disconnected between the stop valve 17 and the opening 13 in the conduit 10. There will be an immediate tendency for fluid contained in the manometer pipe system to escape from the break in the conduit 15, allowing practically the full static pressure existing in the pipe line 10 to be applied to the manometer 11. If this condition is maintained for any appreciable duration of time, the manometer 11 will be seriously damaged. If the instrument be of the Bourdon spring or bellows type the element will be subjected to stresses far in excess of those for which it was designed, with the attendant probability of its being either ruptured or distorted in such a manner as to render the instrument useless. If the manometer be of the mercury column type, as indicated in the drawing, the liquid will be blown out of the reservoir and the instrument made inoperative. The function of the protective device to which this invention is directed is to prevent the attainment or maintenance of such an abnormal pressure across the manometer element. Upon the conduit 15 being disconnected and fluid escaping therefrom, the flow of said fluid from the conduit 19 through the constriction 21 will cause a pressure differential to be developed across said constriction, whereby the pressure applied through the opening 30 to the upper part of the chamber within the valve 17 will be greater than that existing in the lower part of the chamber, and the diaphragm 25 will be forced downward, bringing the seating member 28 into engagement with the seat 26, thus preventing the admission of substantial quantities of fluid from the conduit 19 to the conduit 15, and allowing the pressure in the conduit 19 to build up to a value approximating the static pressure existing in the pipe line 10. Thus the manometer element 11 will be relieved from the application of extreme differential pressure, and protected from serious damage.

The substantial stoppage of flow through the constriction 21 will cause the pressures on opposite sides of the diaphragm 25 to tend to become equalized, but because of the excess of effective area of the diaphragm on the side remote from the valve seat 26 over that on the same side of the valve, there will remain a component of pressure sufficient to overcome the influence of the spring 29 and maintain the valve elements in closed engagement, and rendering re-opening of the stop-valve impossible until the defective conduit 15 has been repaired and a back-pressure again built up in the same.

As the action of operating the stop-valve 17 requires the passage of an appreciable volume of fluid in order to close the valve, and as there is the possibility of slight leakage therethrough after the valve is closed, the by-pass valve 34 provides means of supplying such "make-up" fluid as may be necessary to meet these conditions, without abnormally stressing or otherwise damaging the manometer. The back-pressure valves 33 and 34 are each adjusted to open at a pressure very slightly in excess of that representing the operating range of the manometer 11 and not sufficient to damage the instrument. Upon the building up of such a pressure due to escape of fluid from the conduit 15, the seating member 36 within the back-pressure valve 34 will be lifted off the seat 35 due to the pressure from the conduit 20 exceeding that in the conduit 19 by an amount greater than that for which the spring 37 is adjusted. Fluid will thus be free to pass from the conduit 20 in an upward direction through the back-pressure valve 34 and into the conduit 19, thus off-setting the tendency for a high differential to develop across the manometer, and also supplying through the constriction 21 such flow as may be permitted by imperfect closing of the stop valve 17, any differential pressure caused by such flow through the constriction 21 tending to maintain said valve 17 pressed against the seat 26.

In a similar manner, should the conduit 16 become disconnected or open to the atmosphere the escape of fluid therefrom will cause a pressure to be developed across the constriction 22, with a resultant closure of the stop valve 18; and should leakage through said stop valve continue sufficient to build up an undesirable differential pressure across the manometer 11, the back-pressure valve 33 will yield and will open, placing conduits 19 and 20 in communication, and allowing sufficient fluid to pass to prevent the development of the undesirable excess pressure across the manometer element.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In combination, conduit means adapted to contain fluids at different pressures, a manometer responsive to the differences between said pressures, connections between said manometer and said conduit means, valve means in said connections normally open to provide communication between said conduit means and said manometer, and means cooperating with said valve means and responsive to failure of a portion of said conduit means for causing operation of said valve means to restrict communication between said conduit means portion and said manometer.

2. In combination, conduit means adapted to contain fluids at different pressures, a manometer responsive to the differences between said pressures, connections between said manometer and said conduit means, valve means in said connections normally open to provide communication between said conduit means and said manometer and means cooperating with said valve means for causing the latter to restrict communication between said manometer and a portion of said conduit means in response to a velocity of fluid flow in excess of a given value in the connections between said conduit means portion and said manometer.

3. In combination, a pair of conduits adapted to contain fluids at different pressures, a manometer responsive to the difference between said pressures, means connecting said manometer to one of said conduits, a valve in said connecting means, differential-pressure responsive means for maintaining said valve normally open to provide communication between said manometer and said conduit, a constriction in said connecting means, connections for applying the pressures on opposite sides of said constriction to said differential-pressure means for operating said valve to flow-restricting position when the pressure differential across said constriction exceeds a predetermined value, and means connecting said manometer to the other of said conduits.

4. In combination, a pair of conduits adapted to contain fluids at different pressures, a manometer responsive to the difference between said pressures, means connecting said manometer to one of said conduits, a valve in said connecting means, a spring maintaining said valve normally open to provide communication between said conduit and said manometer, a diaphragm attached to said valve, a constriction in said connecting means, connections for applying the pressures on opposite sides of said constriction to said diaphragm for causing the latter to act in opposition to said spring to operate said valve to flow-restricting position when the pressure differential across said constriction exceeds a predetermined value, and means connecting said manometer to the other of said conduits.

5. In combination, a pair of conduits adapted to contain fluids at different pressures, a manometer responsive to the difference between said pressures, means connecting said manometer to one of said conduits, means connecting said manometer to the other of said conduits, independently operable valve means in each of said connecting means normally open to establish communication between the corresponding conduit and said manometer, and means responsive to failure of either of said conduits for causing operation of the corresponding valve means to restrict flow therethrough.

6. In combination, conduit means adapted to contain fluids at different pressures, a manometer responsive to the differences between said pressures, connections between said manometer and said conduit means, first valve means in said connections normally open to provide communication between said conduit means and said manometer, normally closed second valve means adapted to enable fluid pressure in said connections to by-pass said manometer, means cooperating with said first valve means and responsive to failure of a portion of said conduit means for causing said valve means to restrict communication between said conduit means portion and said manometer, and means for enabling said second valve means to open when the differential pressure across said manometer exceeds a predetermined value.

7. In combination, a pair of conduits adapted to contain fluids at different pressures, a manometer responsive to the difference between said pressures, means connecting said manometer to one of said conduits, a valve in said connecting means, differential-pressure responsive means for maintaining said valve normally open to provide communication between said manometer and said conduit, a constriction in said connecting means, connections for applying the pressures on opposite sides of said constriction to said differential-pressure means for operating said valve to flow-restricting position when the pressure differential across said constriction exceeds a predetermined value, and means connecting said manometer to the other of said conduits, said differential-pressure responsive means comprising a member subject on opposite sides to fluid pressures, which member, in the flow-restricting position of said valve, has less effective area on the side for moving said valve away from said position than on the side for maintaining said valve in said position.

8. In combination, a pair of conduits adapted to contain fluids at different pressures, a manometer responsive to the difference between said pressures, means connecting said manometer to one of said conduits, a valve in said connecting means, a spring maintaining said valve normally open to provide communication between said conduit and said manometer, a diaphragm attached to said valve, a constriction in said connecting means, connections for applying the pressures on opposite sides of said constriction to said diaphragm for causing the latter to act in opposition to said spring to operate said valve to flow-restricting position when the pressure differential across said constriction exceeds a predetermined value, and means connecting said manometer to the other of said conduits, said diaphragm, when said valve is in flow-restricting position, having less effective area on the side of said spring than on the opposite side.

9. In combination, conduit means adapted to contain fluids at different pressures, a manometer responsive to the differences between said pressures, connections between said manometer and said conduit means, a valve in said connections, operating means for said valve including a movable pressure-responsive element normally maintaining said valve open to provide communication between said conduit means and said manometer, and connecting means including a constriction for applying pressure to said element so that said element is responsive to failure of a portion of said conduit means for shifting said valve to a position restricting communication between said conduit means portion and said manometer, said element, when said valve is in said restricting position having less effective area on one side than on the other.

10. In combination, conduit means adapted to contain fluids at different pressures, a manometer responsive to the differences between said pressures, connections between said manometer and said conduit means, valve means in said connections normally open to provide communication between said conduit means and said manometer, and means comprising fixed constrictions in said connections and connections from said constrictions, said means cooperating with said valve means and responsive to failure of a portion of said conduit means for operating said valve means to restrict communication between said conduit means portion and said manometer.

11. In combination, a pair of conduits adapted to contain fluids at different pressures, a manometer responsive to the difference between said pressures, means connecting said manometer to one of said conduits, means connecting said manometer to the other of said conduits, independently operable valve means in each of said connecting means normally open to establish communication between the corresponding conduit and said manometer, and fixed-orifice means responsive to failure of either of said conduits for operating the corresponding valve means to restrict flow therethrough.

12. In combination, conduit means adapted to contain fluids at different pressures, a manometer responsive to the differences between said pressures, connections between said manometer and said conduit means, fluid pressure actuated valve means in said connections normally open to provide communication between said conduit means and said manometer, valve means normally closed and adapted when open to enable fluid pressure in said connections to by-pass said manometer, means comprising fixed constrictions in said connections and connections from said constrictions adapted upon failure of a portion of said conduit means to apply pressure to said pressure-actuated valve means for restricting communication between said conduit means portion and said manometer, and means for enabling said second valve means to open when the differential pressure across said manometer exceeds a predetermined value.

13. In combination, conduit means adapted to contain fluids at different pressures, a manometer responsive to the differences between said pressures, connections between said manometer and said conduit means, first valve means in said connections normally open to provide communication between said conduit means and said manometer, means comprising fixed constrictions in said connections and connections from said constrictions cooperating with said valve means and responsive to failure of a portion of said conduit means for operating said valve means to restrict communication between said conduit means portion and said manometer, normally closed valve means, and connections to said normally closed valve means for opening the same to by-pass said manometer and establish communication between said connections cooperating with the first mentioned valve means.

14. In combination, conduit means adapted to contain fluids at different pressures, a manometer responsive to the differences between said pressures, connections between said manometer and said conduit means, a valve in said connections, operating means for said valve including a movable pressure-responsive element normally maintaining said valve open to provide communication between said conduit means and said manometer, and connecting means including a constriction for applying pressure to said element so that said element is responsive to failure of a portion of said conduit means for shifting said valve to a position restricting communication between said conduit means portion and said manometer, said element, when said valve is in said restricting position having less effective area on one side than on the other.

JOHN WINFRED BEECHER.